2,798,841

United States Patent Office

Patented July 9, 1957

2,798,841

TREATMENT OF PETROLEUM MATERIALS AND PRODUCTS THEREOF

John J. Fish, New York, N. Y., assignor to Sun Chemical Corporation, Long Island City, N. Y., a corporation of Delaware No Drawing. Application September 6, 1952, Serial No. 308,293

15 Claims. (Cl. 196—21)

The present invention relates to the treatment of petroleum waxes, and relates more particularly to processes for modifying petroleum hydrocarbon waxes to impart improved properties thereto, and relates also to the modified wax products obtained thereby.

One object of the present invention is to provide processes for modifying petroleum hydrocarbon waxes to impart thereto improved characteristics of hardness penetration, flexibility, adhesion, and setting properties.

Another object of the present invention is to provide modified petroleum hydrocarbon waxes characterized by the ability to form highly glossy, homogeneous films on drying from solutions thereof.

Another object of the present invention is to provide modified petroleum hydrocarbon waxes which are capable of forming stable emulsions in water which, on drying upon a base supporting material, furnish hard, glossy films having excellent adhesion to the base material.

Another object of the present invention is to provide modified petroleum hydrocarbon waxes which are thermothickening in character.

Other objects of the present invention will be apparent from the description and appended claims.

The wax materials which are processed in accordance with the present invention to provide the modified wax products described herein are preferably those which are derived from crude petroleums. The desired starting materials are the hard, high melting point microcrystalline waxes obtained by settling Texas crude petroleums or by separating fractions thereof so that the relatively high melting point microcrystalline waxes will be separated therefrom.

The methods of producing and refining such waxes are well known in the art. For example, the wax containing residues obtained by cold settling crude petroleums or by fractionation of crude petroleums are generally subjected to treatment with sulfuric acid to effect precipitation of asphalts and tarry materials which are separated from the wax as a black sludge. The wax containing residues are then ordinarily neutralized with alkali and subjected to a decolorization treatment with fuller's earth or like materials to remove suspended and colored impurities, and may thereafter be subjected to steam distillation or vacuum distillation to remove volatile hydrocarbons therefrom. To remove the oils still contained in the wax containing residues, the said residues are ordinarily subjected to solvent extraction processes, such as the well-known benzol-methyl ethyl ketone solvent treatment, whereby a substantially oil-free wax material is obtained. The wax materials are then usually bleached to a light color by treatment with fuller's earth or by percolation over a material such as bauxite. The waxes thus obtained are typical of the hard microcrystalline waxes obtained from petroleum sources which are readily available commercially and which constitute the preferred starting materials in carrying out the present invention.

In accordance with the present invention, modified wax products having the properties and characteristics herein described may be obtained by subjecting a hydrocarbon wax material obtained from petroleum sources preliminarily to treatment, under agitation conditions, with not less than 2 percent by weight of potassium hydroxide at a temperature within the range of approximately 250°–270° C. for a period of at least ten hours and generally for a period of between 10–30 hours, and subsequently subjecting the potassium hydroxide treated wax material to treatment with an oxygen-containing gas, such as air, for a period of approximately 6–30 hours at a temperature within the range of approximately 145°–160° C. There is thus obtained a wax product of substantially increased hardness and of higher melting point than the original starting material and, further, of substantially changed properties. For example, the modified wax product secured in accordance with the present invention is less soluble in aliphatic hydrocarbon solvents than the original starting material and becomes very much less soluble in such solvents the longer the reaction is carried out; while at the same time the solubility of the treated wax product in aromatic hydrocarbon solvents increases substantially. The treated wax products are also different from the starting wax materials in that these wax products are thermothickening in character. When heated to the point at which the treated wax products begin to melt, continued heating at such temperatures causes the wax material to thicken considerably and may even cause gelation of the said wax. This property of the modified wax products of the present invention makes these materials particularly useful in coating compositions which require the application of heat for setting purposes. Thus, these wax materials are useful in combination with water repellent compounds of the quaternary ammonium type which, when applied to textile materials, require a subsequent curing treatment at elevated temperatures to effect setting and insolubilization of the applied compositions.

In their physical properties, the modified wax products of the present invention have many of the characteristics of true resinous materials. Thus, even though the new wax products as obtained are extremely hard, nevertheless they are capable of forming highly flexible films when supported on flexible base materials such as ordinary paper stocks, which films will not crack or flake off from the supporting base material upon normal handling thereof. This property of the new wax products of the present invention, together with their non-blocking characteristics, enables the use of the modified wax products of the present invention as a direct replacement for polyethylene in paraffin-polyethylene blends used in the coating of paper. The new wax products, when applied as films, have also been found to be highly adherent to glassine paper, to cellophane, and to the various commercial plastics.

The adhesive and film-forming properties of the modified wax products of the present invention are fully retained when these materials are applied either in emulsion form, such as emulsions of the waxes in water, or when deposited from solutions thereof in suitable solvents, either alone or in combination with other waxes. The fact that the new wax products of the present invention are capable of forming films when deposited from solutions thereof is rather surprising since the ordinary hard microcrystalline waxes tend to crystallize from solutions and leave a powdery deposit upon drying which is non-adherent to the surface to which the wax solution has been applied. Thus, by the use of the modified wax products of the present invention, hard and highly flexible coatings or films of wax can be applied to materials such as textiles, plastic materials, paper, etc., where the normal hot melt application of waxes to such materials is undesirable.

With respect to the process hereinbefore outlined for preparing the wax products of the present invention, the preliminary treatment of the starting material with potassium hydroxide at the temperatures set forth is requisite toward obtaining the desired end product since, by such treatment, the hydrocarbon wax material utilized as the starting material is apparently inhibited against extensive oxidation during the subsequent air blowing treatment at the temperatures employed therefor. To explain what is meant by this, when the potassium hydroxide treated wax material is subjected to air blowing at the temperatures hereinbefore set forth, there is a period of several hours' duration during which slight oxidation of the wax material apparently takes place, evidence by the characteristic odor which accompanies such reaction. At the end of such period of time, however, the characteristic odor of oxidation is no longer evident, indicating that oxidation of the wax material has ceased. The air blowing is then continued under such non-oxidizing conditions until a wax product having the characteristics of those herein described is obtained. Under ordinary conditions, that is, without any preliminary potassium hydroxide treatment, air blowing of the starting wax materials at the temperatures required to effect modification thereof in accordance with the present invention results in an uncontrollable oxidation reaction which, when carried out for the length of time required to produce the wax products of the present invention, produces a dark brown oxidized wax product which is relatively soft and which has none of the characteristics of the wax products herein described. It has also been attempted to carry out the preliminary treatment with materials such as sodium hydroxide, sodium carbonate and lithium hydroxide in place of potassium hydroxide. However, these materials do not operate to provide the results obtained by using potassium hydroxide. Air blowing of waxes which have preliminarily been treated with these materials, when carried out under the temperature conditions required to modify the said waxes in accordance with the present invention, results in almost complete oxidation of the waxes.

Similarly, the conditions outlined for the preliminary treatment with potassium hydroxide are likewise critical with respect to the attainment of the desired end product. For example, if less than 2 percent of potassium hydroxide based on the weight of the starting material is employed, excessive oxidation of the treated wax material will take place upon subsequent air blowing. In carrying out the invention, it is preferred to employ between 2 percent and 3 percent by weight of potassium hydroxide based on the weight of the starting material. Such an amount is completely effective in carrying out the preliminary treatment and in insuring the production of the desired end product in the subsequent air blowing treatment. Greater amounts of potassium hydroxide may also be utilized in carrying out the preliminary treatment, the upper limit thereof being dictated merely by economy. Further, if the temperature of the alkali treatment is too low or if the duration of the said treatment is too short, the treated wax material will undergo oxidation during the subsequent air blowing operation at the temperatures employed, yielding wax products having properties entirely different from those characteristic of the products of the present invention. While the potassium hydroxide treatment alone does not effect any substantial changes in the melting point or hardness of the starting material, there is some change in the general solubility characteristics of the said material. For example, whereas the starting hydrocarbon wax material forms a paste when compounded with wax solvents such as naphtha, the potassium hydroxide treated wax material does not form a paste with such solvents but rather forms a slurry of crystals therewith.

Air blowing of the potassium hydroxide treated wax material at the temperatures specified herein effects further changes in the wax material which are not due to oxidation thereof since any oxidation which may take place is very slight. Exactly what changes actually take place in the constitution of the starting wax materials whereby the end products develop thermo-thickening properties and higher melting points and increased hardness is not known. However, it is known that the conditions set forth for the air blowing treatment are also requisite toward obtaining the desired result. For example, air blowing of the potassium hydroxide treated wax material at temperatures substantially below 145° C. has no apparent effect upon the treated wax material. Air blowing at temperatures in excess of approximately 170° C. generally causes runaway oxidation of the wax material, resulting in an oxidized wax product which is not the wax product secured in accordance with the present invention. Also, to effect the radical changes in the wax material as are secured in the present invention, the air blowing should be carried out for a minimum time of at least six hours. The length of time that the air blowing treatment is carried out also generally determines the end characteristics of the wax product, particularly with regard to the melting points and hardness thereof; the longer the treatment, the higher the melting point and the lower the penetration value of the end product. However, higher melting points may also be obtained in a shorter length of time if the air blowing operation is first conducted for a period of about 1 to 4 hours at temperatures within the range of 160°–170° C. and then at the lower range of 145°–160° C. for a period of between 2–25 hours, the total time of such air-blowing operation again being not less than 6 hours. As to the amount of air to be used in the air-blowing treatment and the rate of flow thereof, a sufficient amount of air should be employed in such a rate of flow as to maintain the molten wax material in a state of vigorous agitation. The air should preferably be so distributed as to avoid the occurrence of substantially inactive zones in the reaction mass.

In connection with the preliminary treatment of the waxes with potassium hydroxide as herein described, it is advisable that the treatment be carried out in an atmosphere of an inert gas, such as nitrogen or carbon dioxide, since the treating temperatures under which the potassium hydroxide treatment is carried out are higher than the flash points of the waxes.

The following examples are illustrative of successful commercial operations for preparing the modified wax products of the present invention.

*Example 1*

100 parts by weight of a microcrystalline wax obtained from Texas crude tank bottoms and having a melting point of 190° F. and a penetration value of 5 are heated in a suitable vessel till the wax material is in a molten state and two parts by weight of potassium hydroxide are added thereto. The temperature of the wax material is then raised to 250° C. and the wax material is maintained at such temperature under constant agitation conditions for a period of 18 hours, the entire treatment being carried out under a blanket of nitrogen gas. The treated wax is then transferred to a vessel equipped with heating means and also with air inlet means suitably located in the bottom of the vessel and connected to a suitable device for furnishing air under pressure as, for example, a compressor. The treated wax material is then subjected to continuous air blowing at a constant temperature of 155° C.±5° C. for a period of 21 hours. The product thus obtained, upon solidification to room temperature, is a light yellow colored wax material having a penetration value of 2 and a melting point of 201° F., and is thermo thickening in character.

With reference to the penetration values mentioned herein, these values refer to penetration determined according to the A. S. T. M. method D-5-25, published by the American Society for Testing Materials.

While the above operation is shown to be carried out successively in separate vessels, the potassium hydroxide treatment can conveniently be carried out in the vessel in which the air blowing is done provided such vessel is equipped to provide the temperatures required for the potassium hydroxide treatment.

*Example 2*

100 parts by weight of a microcrystalline wax obtained from Texas crude tank bottoms and having a melting point of 195° F. and a penetration value of 4.5 are treated with 2.5 parts by weight of potassium hydroxide at a temperature of 255° C.±5° C. for a period of 27 hours under constant agitation conditions. The treated wax material is then subjected to air blowing as described in Example 1 for a period of 30 hours at 160° C. The product thus obtained displayed a softening point of 185° F., a melting point of 238° F., and a penetration value of 1 to 2, and had properties characteristic of the wax products of the present invention.

*Example 3*

100 parts by weight of a microcrystalline wax obtained from Texas crude tank bottoms and having a melting point of 195° F. and a penetration value of 4.5 are treated with 2.25 parts by weight of potassium hydroxide at a temperature of 250° C. for a period of 30 hours. The treated wax material is then air blown for 4 hours at a temperature of 165° C. and then for 2 hours at a temperature of 155° C. The wax product obtained as a result of such treatment had a melting point of 248° F. and a penetration value of 0.5 to 1.0 and displayed highly thermo-thickening characteristics, forming a highly viscous material when heated at its melting point temperature.

*Example 4*

100 parts by weight of a microcrystalline wax obtained from Texas crude tank bottoms and having a melting point of 190° F. and a penetration value of 5 are treated with 7% by weight of potassium hydroxide at a temperature of 260° C. for a period of 18 hours. The treated wax is then blown with air for 21 hours at a temperature of 155° C.±5° C. There is thus obtained a light yellow wax product having a softening point of 194° F., a melting point of 245° F., and a penetration value of 1. The wax product thus obtained is also characterized by its thermo-thickening properties.

*Example 5*

100 parts by weight of paraffin, having a melting point of 133–135° F. and a penetration value of 11 are subjected to treatment with 2 parts by weight of potassium hydroxide at a temperature of 250° C. for a period of 18 hours under constant agitation conditions. The treated paraffin is then blown with air at a temperature of 155° C. for a period of 21 hours. The resultant product displayed a melting point of 170° F. and a penetration value of 7 to 8 and formed a highly viscous melt when heated to its melting point which became progressively more viscous on continued heating.

The modified wax products of the present invention are further characterized by their ability to combine with free sulfur to provide smooth, cloudy wax materials which show no separation of sulfur therefrom either on solidification or when dissolved in the usual wax solvents. Such a wax material containing, for example, 5% by weight of sulfur may be obtained by heating 95 parts by weight of a wax product of any of the foregoing illustrative examples to a temperature of 120–130° C. and then adding thereto 5 parts by weight of sulfur. Upon addition of the sulfur an exothermic reaction occurs, resulting normally in a 10° C. rise in the temperature of the wax-sulfur mixture. The wax-sulfur mixture is then satisfactorily held at such temperature with constant agitation till all of the sulfur has entered into solution or has reacted with the wax material. This process can be accelerated by the addition of about 1% by weight of stearic acid. The sulfur-containing wax materials obtained as described above are capable of forming smooth, non-tacky, homogeneous wax films which are also highly flexible when supported on a flexible base material such as paper or plastic film. They also form solid, translucent pastes with solvents such as VM&P naphtha which resemble petroleum jelly and which exhibit extremely high solvent retention.

The modified wax products of the present invention may also be utilized in self-polishing floor wax emulsions. In this respect, the wax products of Examples 1 to 4 are particularly suitable. A typical example of a commercial non-rub floor wax emulsion is a composition consisting, in parts by weight, of 48 parts of oxidized wax or carnauba wax, 57 parts of an oil-soluble modified phenol-formaldehyde resin, 5 parts of oleic acid, 4 parts of triethanolamine, 3 parts of 2 amino 2 methyl 1 propanol, 3 parts of borax, and water in sufficient amount to make a total of 1000 parts. The wax products of Examples 1 to 4 can be used to replace all of the phenol-formaldehyde resin in the above composition without impairment of the leveling or film-forming properties of such emulsions or of the gloss, toughness, or water resistance of the applied film. In preparing such wax emulsions, a wax product of any of Examples 1 to 4 is melted together with an emulsifiable wax such as carnauba wax or an emulsifiable oxidized petroleum wax, and the oleic acid. The wax mixture is then cooled to about 210° F., the 2 amino 2 methyl 1 propanol added thereto, and the whole is then stirred for about 10 minutes at such temperature. Borax dissolved in about 30 parts of water is then added and the mixture is stirred for about 15 minutes at 210° F. The hot wax blend is then poured into the water which has been heated to a temperature of about 210° F., and the whole is agitated vigorously to form the emulsion. The emulsion is then cooled and adjusted to a pH of 8.5 to 9.0 with ammonia water. The emulsion thus obtained has very good cold and heat stability and excellent leveling properties, and fiilms formed therefrom are highly glossy, tough, and have excellent water-resistance and slip-resistance.

The wax products of the present invention have a wide variety of commercial applications. For example, they impart high gloss and non-blocking properties to paraffin blend coatings. When used in printing inks they provide highly scratch-resistant prints. When applied as films, they are strongly adherent to cellophane and glassine paper and may be used to increase the moisture resistance of such materials. The wax products are particularly useful in combination with water-repellents used in the treatment of textiles, and in non-rubbing, self-polishing wax emulsions.

While the above products and processes of preparing the same constitute preferred embodiments of the present invention, changes may be made therein wihout departing from the scope of the invention as defined in the appended claims.

What is claimed is:

1. A process of modifying a petroleum hydrocarbon wax material to impart improved characteristics of hardness, flexibility, and setting properties thereto which comprises subjecting a refined petroleum hydrocarbon wax material to treatment with not less than 2% by weight of potassium hydroxide at a temperature within the range of approximately 250–270° C. for approximately 10–30 hours, and subsequently subjecting the said treated petroleum hydrocarbon wax material to treatment with an oxygen-containing gas at a temperature within the range of approximately 145–170° C. for not less than approximately 6 hours.

2. The process set forth in claim 1 wherein the refined petroleum hydrocarbon wax material is a microcrystalline wax.

3. The process set forth in claim 1 wherein the refined petroleum hydrocarbon wax material is paraffin.

4. The product obtained by the process of claim 1.

5. The product obtained by the process of claim 2.

6. The product obtained by the process of claim 3.

7. The process set forth in claim 1 wherein the treatment with an oxygen containing gas is performed at a temperature within the range of approximately 145–160° C. for a period of approximately 6–30 hours.

8. The process set forth in claim 7 wherein the refined petroleum hydrocarbon wax material is a microcrystalline wax.

9. The process set forth in claim 7 wherein the refined petroleum hydrocarbon wax material is paraffin.

10. The process set forth in claim 1 wherein the treatment with an oxygen containing gas is first performed at a temperature within the range of 160–170° C. for a period of about 1–4 hours and then at a temperature within the range of 145–160° C. for a period of approximately 2–25 hours, the total time of said treatment with an oxygen containing gas being not less than 6 hours.

11. The process set forth in claim 10 wherein the refined petroleum hydrocarbon wax material is a microcrystalline wax.

12. The process set forth in claim 10 wherein the refined petroleum hydrocarbon wax material is paraffin.

13. The process set forth in claim 1 wherein the refined petroleum hydrocarbon wax material is treated with 2–3% by weight of potassium hydroxide.

14. The process set forth in claim 2 wherein the microcrystalline wax is treated with 2–3% by weight of potassium hydroxide.

15. The process set forth in claim 3 wherein the paraffin is treated with 2–3% by weight of potassium hydroxide.

References Cited in the file of this patent

UNITED STATES PATENTS

| | | |
|---|---|---|
| 1,983,672 | Labarthe et al. | Dec. 11, 1934 |
| 2,003,789 | Falls | June 4, 1935 |
| 2,009,664 | James | July 30, 1935 |
| 2,075,871 | Smith | Apr. 6, 1937 |
| 2,119,940 | Carr | June 7, 1938 |
| 2,315,077 | Pfennig et al. | Mar. 30, 1943 |
| 2,471,102 | Fish | May 24, 1949 |